United States Patent [19]

Drupsteen

[11] Patent Number: 4,535,451
[45] Date of Patent: Aug. 13, 1985

[54] FOURTH-ORDER DIGITAL MULTIPLEX SYSTEM FOR TRANSMITTING A PLURALITY OF DIGITAL SIGNALS AT A NOMINAL BIT RATE OF 44 736 KBIT/S

[75] Inventor: Jan Drupsteen, Hilversum, Netherlands

[73] Assignee: U.S. Philips Corporation, New York, N.Y.

[21] Appl. No.: 465,741

[22] Filed: Feb. 11, 1983

[30] Foreign Application Priority Data

Aug. 5, 1982 [NL] Netherlands .................... 8203110

[51] Int. Cl.³ ............................................... H04J 3/00
[52] U.S. Cl. ........................................ 370/99; 370/102
[58] Field of Search .................................. 370/99, 102

[56] References Cited

U.S. PATENT DOCUMENTS 3,824,349  7/1974  Buchner ............................. 370/102
3,985,961 10/1976  Voss et al. ......................... 370/102
4,410,980 10/1983  Takasaki ............................. 370/102

OTHER PUBLICATIONS

"A Third Order Digital Multiplex Equipment Operating at 34368 Kbits/s and Using Positive Justification", by A. Barbetta, Conference on Telecomm. Transmission, London, England, Sep. 9–11, 1975.

Primary Examiner—Douglas W. Olms
Assistant Examiner—Kenneth I. Rokoff
Attorney, Agent, or Firm—Thomas A. Briody; William J. Streeter; Leroy Eason

[57] ABSTRACT

The CCITT has given recommendations for two types of hierarchies of PCM multiplex systems for telephony transmission: a first type based on a first-order PCM multiplex system having a nominal bit rate of 2048 kbit/s for 30 telephone channels while employing the A-law, and a second type based on a first-order PCM multiplex system having a nominal bit rate of 1544 kbit/s for 24 telephone channels while employing the $\mu$-law.

The fourth-order digital multiplex system in accordance with the invention comprises a transmitter (1) having a digital multiplexer (7) arranged for cyclically bit-wise interleaving three digital signals having nominal bit rates of 44 736 kbit/s, the third order in the second type of PCM multiplex hierarchy, into a composite digital signal having a nominal bit rate of 139 264 kbit/s, the fourth order in the first type of PCM multiplex hierarchy, and having a specific frame structure (a in FIG. 6), while the system further comprises a receiver (2) having a digital demultiplexer (13) arranged for separating the said composite digital signal into the three original signals. This accomplishes that the fourth-order systems in both types of PCM multiplex hierarchies operate with the same nominal bit rate of 139 264 kbit/s.

3 Claims, 8 Drawing Figures

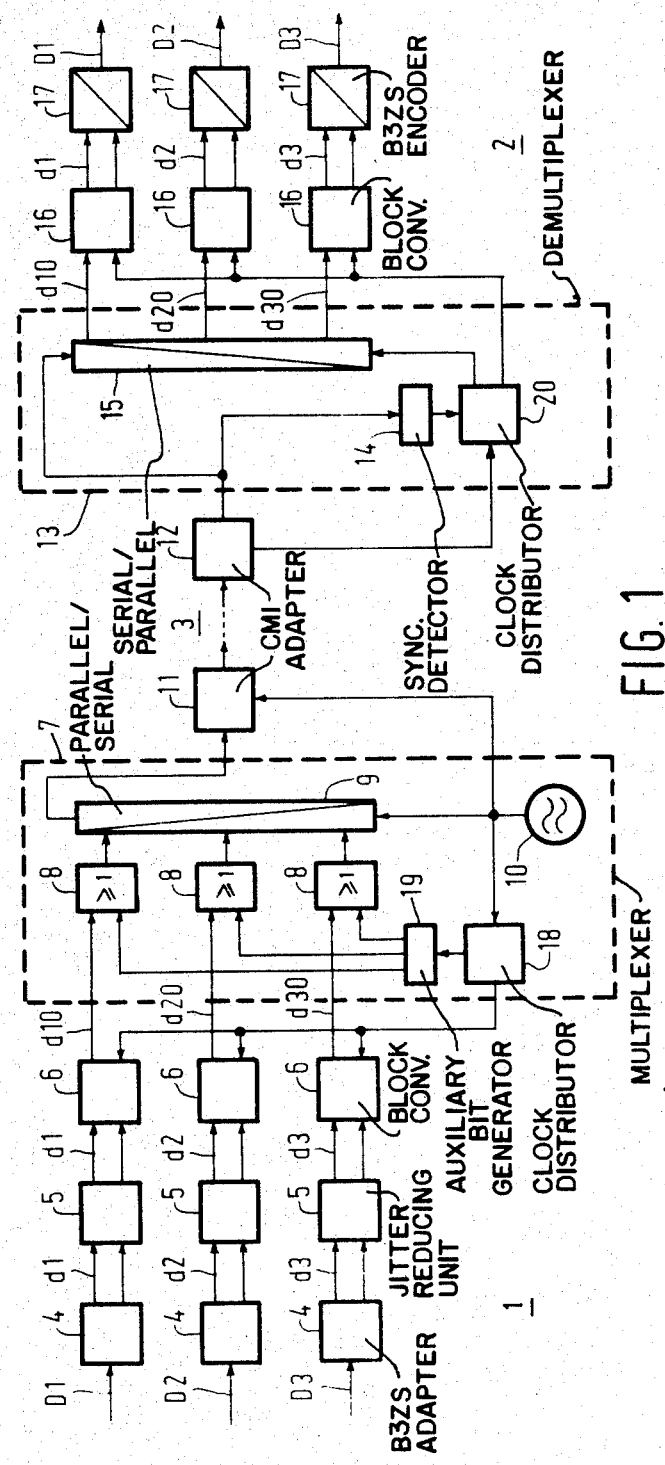
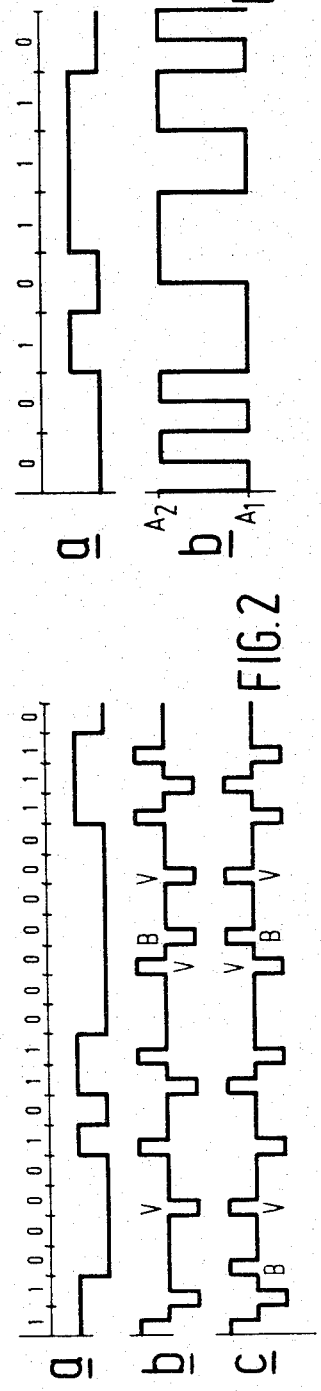

FOURTH-ORDER DIGITAL MULTIPLEX SYSTEM FOR TRANSMITTING A PLURALITY OF DIGITAL SIGNALS AT A NOMINAL BIT RATE OF 44 736 KBIT/S

BACKGROUND OF THE INVENTION

The invention relates to a fourth-order digital multiplex system, comprising a transmitter having a digital multiplexer and a receiver having a digital demultiplexer for TDM transmission of a plurality of digital signals at a nominal third-order bit rate of 44 736 kbit/s over a common digital path between the said multiplexer and the said demultiplexer.

At present there are two types of hierarchies of PCM multiplex systems for which the CCITT has given recommendations as regards the methods of multiplexing, the interfaces and the line transmission systems (see CCITT Yellow Book, Vol. III, Fascicle III.3, Recommendations of the series G.700 and G.900, Geneva, 1981).

A first type of hierarchy, which has found general acceptance in Europe, is based on a first-order PCM multiplex system with a nominal bit rate of 2048 kbit/s for the transmission of 30 telephone channels, the A-law being used for encoding. Within this first hierarchy, multiplexing takes place in factors of four and the recommended nominal bit rates amount to 8448 kbit/s for the second order, 34 368 kbit/s for the third order and 139 264 kbit/s for the fourth order.

Particularly in the United States, a second type of hierarchy has been generally accepted. This type is based on a first-order PCM multiplex system with a nominal bit rate of 1544 kbit/s for the transmission of 24 telephone channels, the $\mu$-law being used for encoding. Within this second hierarchy, the recommended nominal bit rate amounts to 6312 kbit/s for the second order, while of the two recommended nominal bit rates for the third order the bit rate of 44 736 kbit/s is employed in the majority of cases. For the fourth order within this second hierarchy the CCITT has not yet given a recommendation, but the digital transmission network of Bell System in the United States now employs for the fourth order a nominal bit rate of 274 176 kbit/s for the transmission of six digital signals at a nominal third-order bit rate of 44 736 kbit/s.

The long-haul digital line transmission systems for this fourth-order bit rate of 274 176 kbit/s can be realized by extending the already existing long-haul line transmission network with completely novel systems for this purpose. As, however, a very substantial part of the expense for any long-haul line transmission system is formed by costs that are needed for whatever system is used, such as the costs for the cable itself, laying the cable, building and equipping terminal stations and subterranean repeater stations, the practical implementation of novel digital line transmission systems preferably utilizes the already existing long-haul analog line transmission systems. In the case at issue, the analog line transmission systems of the type L4 and L5 having a capacity of 3600 and 10800 telephone channels, respectively, on each ⅜-inch coaxial cable and having nominal repeater spacings of 3218 m (2 miles) and 1609 m (1 mile), respectively, may be considered for use. For the transmission of digital signals at a bit rate of 274 176 kbit/s over these ⅜ inch coaxial cables the consecutive regenerative repeaters are spaced up to 1737 m (5700 feet) apart. This means that the existing L5-system can be used when the analog repeaters are replaced by digital regenerative repeaters, but this solution has the disadvantage that the existing system capacity of 10 800 telephone channels is reduced to a capacity of not more than 4032 telephone channels, while moreover a L5-system is not available for all desired routes. These disadvantages are obviated when use is made of the L4-system, which is available at a much larger scale. However, in the latter system it is not sufficient merely to replace all the analog repeaters by digital regenerative repeaters but it is then also necessary to arrange an additional repeater station for a digital regenerative repeater between every two consecutive existing repeater stations, which entails high additional costs.

SUMMARY OF THE INVENTION

The invention has for its object to provide a novel concept of a fourth-order multiplex system of the type described in the opening paragraph, which renders an economically attractive implementation of this multiplex system, and especially of the associated digital line transmission system, possible.

According to the invention, the fourth-order digital multiplex system is characterized in that the multiplexer is arranged for cyclically bit-wise interleaving three digital signals having nominal third-order bit rates of 44 736 kbit/s into a composite digital signal having a nominal fourth-order bit rate of 139 264 kbit/s and a frame comprising a 12 bit frame alignment signal, a number of service bits and, in addition, for each of the said three signals both a number of N information bits as well as one justification bit with five associated justification service bits, the said number N being chosen such that the nominal justification ratio is located between the values 0.40 and 0.46 or 0.54 and 0.60, which frame is arranged in six consecutive sets having equal numbers of bit time slots, wherein:
  the bits of the frame alignment signal occupy the first 12 bit positions of the first set,
  the justification service bits of the first, second and third of the said three signals occupy the first, second and third bit positions, respectively of, in succession, the second set to the sixth set,
  the justification bits of the first, second and third of the said three signals occupy the fourth, fifth and sixth bit positions, respectively, of the sixth set,
  the service bits occupy the bit positions following after the third bit position in the fourth set, and
  the information bits of the said three signals cyclically occupy the remaining bit positions of the sixth set,
while the said demultiplexer is arranged for separating the said composite signal into the said three signals.

Although the two existing hierarchies of PCM-multiplex systems are based on different first-order bit rates, namely 2048 kbit/s and 1544 kbit/s, the use of the measures in accordance with the invention results in the fourth-order multiplex systems operating in both hierarchies with the same nominal bit rate of 139 264 kbit/s. Apart from advantages for the realization of the digital multiplexers and demultiplexers, this results in the important advantage that in both hierarchies the same digital line transmission systems can be used. In addition, it has been found that for the practical implementation of this digital line transmission system the long-haul analog line transmission network which exists already in the United States can be used very well. More specifically, use can be made of the L4-system which is already employed at a large scale without the need to arrange an additional repeater station for a digital regenerative repeater between every two consecutive existing repeater stations.

SHORT DESCRIPTION OF THE DRAWINGS

An embodiment of the invention and its advantages will now be described in greater detail by way of example with reference to the accompanying drawings, in which:

FIG. 1 shows a general block diagram of a fourth-order digital multiplex system in accordance with the invention:

FIG. 2 shows time-sequential diagrams for converting a binary signal into a signal having the B3ZS code format;

FIG. 5 shows time-sequential diagrams for converting a binary signal into a signal having the CMI code format;

DESCRIPTION OF AN EMBODIMENT

Figure 4:
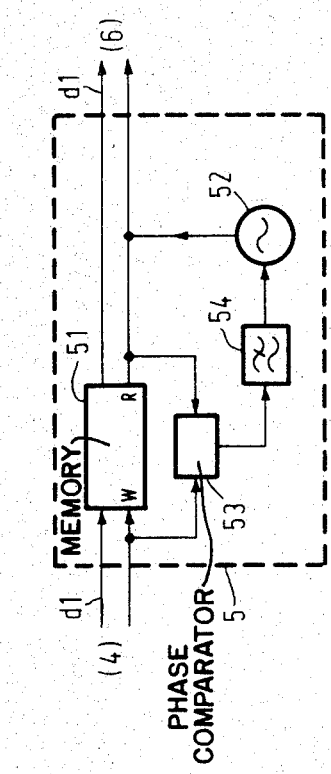
FIG. 4 shows a block diagram of a jitter reducing unit for the transmitter of the system shown in FIG. 1.

FIG. 1 shows the general block diagram of a fourth-order digital multiplex system comprising a transmitter 1 and a receiver 2 for TDM transmission of three digital signals D1, D2, D3 having a nominal third-order bit rate of 44 736 kbit/s over a common digital path 3, the composite digital signal on this path 3 having a nominal fourth order bit rate of 139 264 kbit/s in conformity with Recommendation G.703, §9. The structure and the implementation of the present multiplex system show many similarities to those of the higher-order PCM multiplex systems described in Philips Telecommunication Review, Vol. 38, No. 1, January 1980, pp. 11–22, and therefore the following description will particularly be directed to the specific differences with these prior art systems.

In conformity with Recommendation G.703, §5 the three digital signals D1, D2, D3 having a nominal bit rate of 44 736 kbit/s are applied in the B2ZS code format (bipolar with three-zero substitution code) and on the strength of Recommendation G.752, §1.3 the maximum value of the peak to peak jitter amplitude may be 14 UI (unit interval). In the time-sequential diagrams of FIG. 2, an example is given of the conversion of a binary signal having logic 1 bits and logic 0 bits (diagram a) into a B3ZS-coded signal (diagrams b and c). Logic 1 bits are converted into pulses having a 50% duty cycle and a polarity which in general is alternately positive and negative relative to the level of the logic 0 bits. Exceptions are those cases in which three consecutive logic 0 bits occur, in which cases each block of three consecutive logic 0 bits is replaced by B0V or 00V, where B represents a pulse conforming with the bipolar code rule and V represents a pulse violating the bipolar code rule. The choice of B0V or 00V is made so that the number of B pulses between consecutive V pulses is odd. For diagram B (c) in FIG. 2 it is assumed that an odd (even) number of pulses have been transmitted since the last V pulse.

As signal processing in transmitter 1 is effected on the basis of signals in the normal binary code, each of the three B3Zs coded signals D1, D2, D3 is applied to a B3Zs-adapter 4, in which after regeneration by means of a recovered clock signal a conversion into a binary signal is effected. Each of the binary signals d1, d2, d3 thus obtained is applied together with the associated clock signal to a jitter reducing unit 5, in which the value of the peak-to-peak jitter amplitude, depending on the jitter frequency, is reduced to approximately 1.5 UI. By way of example, FIG. 3 shows the block diagram of one of the three identical B3Zs-adapters 4, more specifically for the signal D1, and FIG. 4 shows the block diagram of one of the three identical jitter reducing units 5, more specifically for the binary signal d1.

Figure 3:
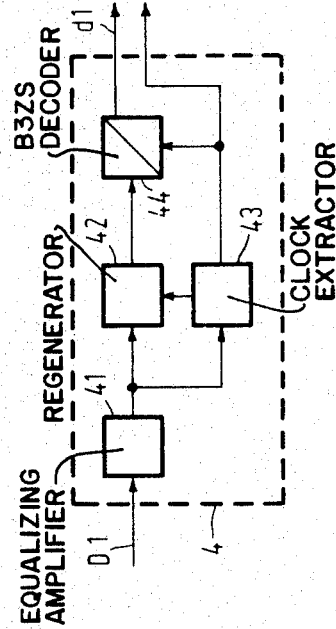
FIG. 3 shows a block diagram of a B3ZS adapter for the transmitter of the system shown in FIG. 1.

In FIG. 3, the B3Zs-coded signal D1 is applied to an equalizing amplifier 41 and the equalized signal is regenerated in a regenerator 42, which is controlled by a 44 736 kHz clock signal recovered from this equalized signal by means of a clock extractor 43. The regenerated signal D1 is now converted into a binary signal d1 by means of a B3Zs-decoder 44 which is also controlled by the recovered clock signal. The binary signal d1 and the recovered 44 736 kHz clock signal are available at the output of this adapter 4. In the jitter reducing unit 5 shown in FIG. 4, this last-mentioned clock signal is used as a write clock for writing the binary signal d1 into an elastic memory 51. This elastic memory is read out under the control of a read clock produced by a voltage-controlled oscillator 52 having a rest frequency of 44 736 kHz. In order to obtain a read clock with considerably less jitter than the write clock use is made of a phase-locked loop. To that end the write clock and the read clock are applied to a phase comparator 53, whose output signal is filtered in a low-pass filter 54 and is then applied to the control input of the oscillator 52. The binary signal d1 read from memory 51 and the 44 736 kHz read clock produced by oscillator 52 are then available at the output of this jitter reducing unit 5.

The binary signals d1, d2, d3, thus obtained are, however, not in sycnhronism and in addition their nominal bit rate of 44 736 kbit/s is not accurately equal to a submultiple of the nominal bit rate of 139 264 kbit/s of the composite digital signal. In order to allow nevertheless synchronous multiplexing in transmitter 1, each one of the three binary signals d1, d2, d3 is applied to a block converter 6 and converted therein into a binary signal having a nominal bit rate of 46 421.3 kbit/s, which is exactly ⅓ part of the nominal bit rate of 139 264 kbit/s, and a frame whose structure is derived from the frame structure of the composite digital signal, as will be explained hereinafter. The three outgoing binary signals d10, d20, d30 from block converters 6 are in synchronism and are applied in a digital multiplexer unit 7 via OR-gates 8 to a parallel-to-serial converter 9, in which multiplexing is effected under the control of a 139 264 kHz system clock produced by a stable oscillator 10. At the output of parallel-to-serial converter 9 the desired composite digital signals occurs with a nominal bit rate of 139 264 kbit/s.

This composite digital signal is applied to digital path 3 which comprises at the transmitter end, a CMI-adapter 11, in which the composite digital signal is converted into the CMI-code format (coded mark inversion) in conformity with Recommendation G.703, 517 9, which format is recommended for the bit rate of 139 264 kbit/s. In FIG. 5 the time-sequential diagrams are an example of the conversion of a binary signal with logic 1 bits and logic 0 bits (diagram a) into a CMI-coded signal (diagram b). The CMI-code is a 2-level code in which a logic 0 bit is coded such that each of two levels, A1 and A2, is present during half a bit time interval (first A1 and then A2) and a logic 1 bit is encoded by either level A1 or A2, during an entire bit time interval and that in such a way that the levels alternate for consecutive logic 1 bits. At the receiver end digital path 3 comprises a CMI-adapter 12 in which, after equalization and regeneration by means of a recovered system clock of 139 264 kHz, a conversion of the received CMI-coded signal into the normal binary code is effected. The original composite digital signal having a nominal bit rate of 139 264 kbit/s and the original system clock of 139 264 kHz are then available at the output of CMI-adapter 12.

In receiver 2, these output signals of CMI-adapter 12 are applied to a digital demultiplexer unit 13. The composite digital signal is applied in demultiplexer unit 13 to a synchronization detector 14 for the frame alignment signal in order to synchronize the demultiplexer unit 13 with the frame of this composite signal, and is further applied to a serial-to-parallel converter 15 in which the bit-wise demultiplexing of the composite signal is effected. Then are available at the three outputs of serial-to-parallel converter 15 the three binary signals d10, d20, d30 having a bit rate of 46 421.3 kbit/s which are each applied to a block converter 16 and converted therein into a binary signal having the original nominal bit rate of 44 736 kbit/s. Each of the binary signals d1, d2, d3 thus recovered is applied to a B3ZS-encoder 17 and converted therein into a B3Zs-encoded signal. The three original signals D1, D2, D3 are then available in the recommended B3ZS code format at the output of the b3ZS-encoders 17.

In the present multiplex system the bit streams of the three tributary signals d1, d2, d3 are cyclically bitwise interleaved into the bit stream of the composite signal, which implies that in the higher-order bit stream a bit bit of signal d1 is followed by a bit of signal d2, etc. Generally, there are several reasons why the higher-order bit stream must have a bit rate which is higher than three times the bit rate of the tributary signals d1, d2, d3. A first reason is that a separate synchronizing signal must be added to the higher-order bit stream to enable a correct demultiplexing into the tributary bit streams, and that at the same time a number of service bits must be added in order to have the equipment associated with the higher-order bit stream function correctly, and possibly to provide auxiliary facilities. A second reason is that differences of frequency between the tributary bit streams which may be received from independent sources, and the system clock for the higher-order bit stream must be coped with. In order to compensate for the differences in bit rates, use is made of positive justification, bit time slots being assigned in the higher-order bit stream in regular intervals, in which time slots either a bit of a tributary signal or no information is transmitted, according to the relative bit rates of the tributary signals and the composite signal. The status of the justification bit time slots is indicated by a number of associated justification service bits, more specifically by an odd number, for example three or five, per justification bit time slot to enable a majority decision about the status and thus to reduce the chance of a faulty status decision, as a faulty status decision at the receiving end results in loss of frame alignment for the tributary bit stream. In addition, the justification process contributes to the jitter of the tributary bit stream at the receiving end. As is explained in the Bell System Technical Journal, Vol. 51, No. 1, January 1972, pp. 165–207, the nominal justification ratio is a critical parameter for the contribution of the justification process to this jitter. The nominal justification ratio $\phi$ is defined as the ratio of the nominal justification rate (the rate at which justification bits without information-content are inserted when the bit rates of the tributary signal and the composite signal are at their nominal values) to the maximum justification rate (the maximum rate at which justification bits without information-content can be inserted); the nominal justification ratio $\phi$ has a value between 0 and 1. As regards the contribution of the justification process to the jitter, it can be seen from FIG. 13–FIG. 16 of the last-mentioned article that the jitter power as a function of $\phi$ is symmetrical relative to $\phi=0.5$ and that its proportionally lowest values are reached for values of $\phi$ in the range between 0.40 and 0.46 (or 0.54 and 0.60).

When the higher-order multiplex system has not yet been laid down in recommendations, it is possible to choose a suitable frame structure of the composite signal and an advantageous value of $\phi$ and thereafter to derive the nominal higher-order bit rate on the basis of the consideration that the ratio of the number of bits supplied by a tributary signal per frame interval to the number of bits transmitted by the composite signal per frame interval must be equal to the ratio of the nominal tributary bit rate to the nominal higher-order bit rate (for practical reasons an integral multiple of 8 kbit/s is always chosen for the last-mentioned bit rate in view of the nominal sampling rate of 8000 samples per second for the PCM-encoding of speech signals).

In the present multiplex system, however, the higher-order bit rate has already been fixed at the recommended nominal value of 139 264 kbit/s. Also now an advantageous value of $\phi$ is chosen, but now, after determination of the number of bits to be added per frame to the higher-order bit stream, the above-mentioned consideration is used to determine the number of information bits N supplied by a tributary signal per frame-intervael. As regards the frame alignment and the (positive) justification, the present system closely fits in with the fourth-order multiplex system of Recommendation G.751, §1.5. Particularly, for each frame 12 frame alignment bits are present and for each tributary signal one justification bit with five associated justification service bits. If six service bits per frame is opted for, the total number of bits per frame amounts to 3N+36, while one tributary signal supplies (N+1−$\phi$) information-bearing bits per frame-interval. For N and $\phi$ there then holds the relation:

$$\frac{N+1-\phi}{3N+36} = \frac{44\ 736}{139\ 264} \qquad (1)$$

With an initial choice $\phi=0.57$ a value N=306.69 then follows from (1). As the frame formed by 3N+36 bits is arranged in six consecutive sets having equal numbers of bits per set and moreover the number of bits per set must be an integral multiple of three in view of the cyclic bit-wise interleaving of the three tributary signals, the value of N is ultimately fixed at N=306, so that the frame comprises 954 bits divided in six sets of 159 bits each. From (1) it then follows that the ultimate value of $\phi$ is equal to $\phi=0.545$.

The ultimate structure of the frame for this specific case is shown in the time-sequential diagram a of FIG. 6, wherein the bit positions in the six sets I–VI are assigned as follows:

- a bunched frame alignment signal F of 12 bits in the first 12 bit positions of set I; this signal F has the form F1, F2, ..., F12 = 111 110 100 000 and corresponds to the frame alignment signal in accordance with Recommendation G.751 (see Table 2/G.751),
- the first justification service bits $C_{1n}$ for the tributary signals dn, where n = 1, 2, 3 in the first three bit positions of set II,
- the second justification service bits $C_{2n}$ for the tributary signals dn, where n 1, 2, 3 in the first three bit positions of set III,
- the third justification service bits $C_{3n}$ for the tributary signals dn, where n 1, 2, 3, in the first three bit positions of set IV,
- the fourth justification service bits $C_{4n}$ for the tributary signals dn, where n = 1, 2, 3 in the first three bit positions of set V,
- the fifth justification service bits $C_{5n}$ for the tributary signals dn, where n 1, 2, 3 in the first three bit positions of set VI,
- the justification bits $J_n$ for the tributary signals dn, where n = 1, 2, 3 in the bit positions 4, 5, 6 of set VI,
- the service bits $S_{1n}$ and $S_{2n}$, where n = 1, 2, 3 in the bit positions 4, 5, 6 and 7, 8, 9, respectively of set IV, and
- the information bits of the tributary signals dn, where n = 1, 2, 3 cyclically distributed over the remaining bit positions of the six sets I–VI.

Figure 6:
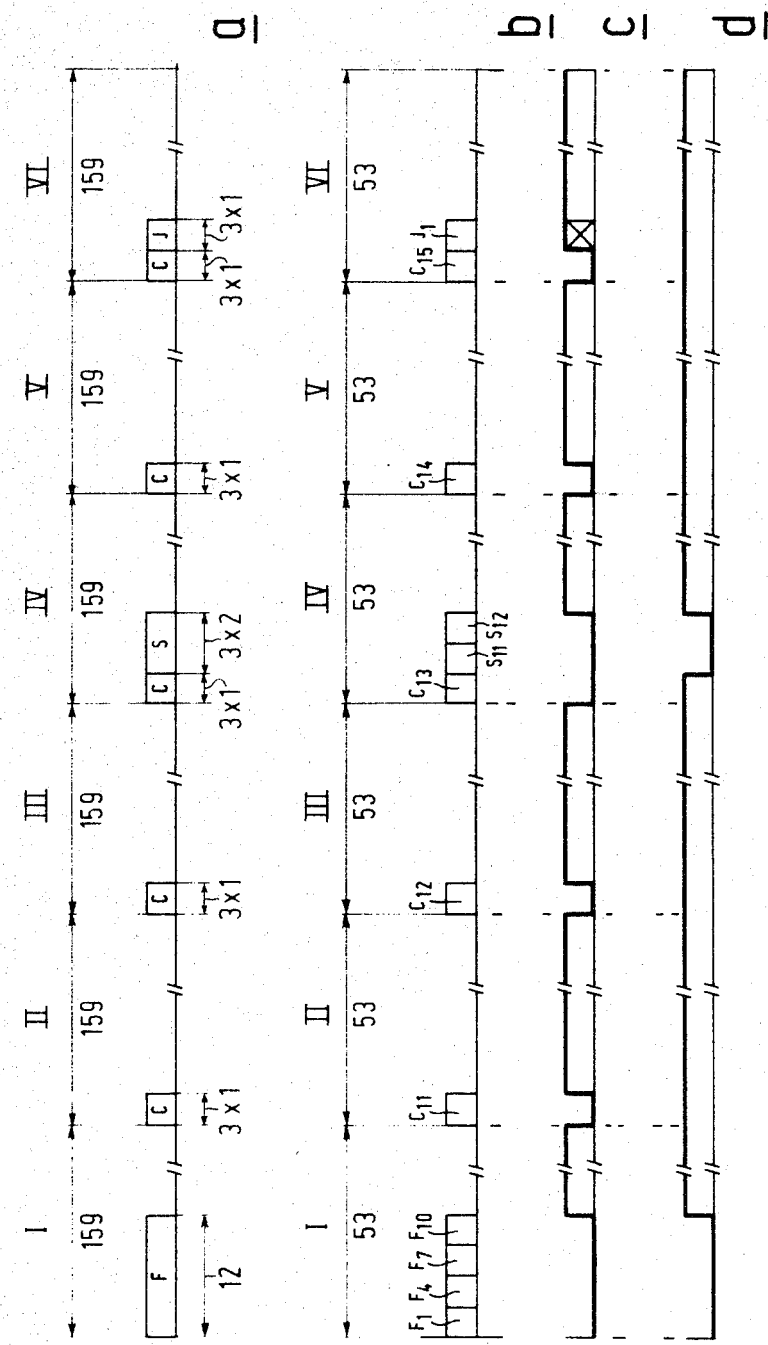
FIG. 6 shows time-sequential diagrams for a frame of the composite signal used in the multiplex system of FIG. 1, for a reduced frame, derived therefrom, of a tributary signal and for clock signals associated therewith.

From the frame of the composite signal such as it is shown in diagram a of FIG. 6 it is possible to derive for each of the tributary signals d1, d2, d3 a reduced frame which is used in the block converters 6 of transmitter 1 for converting the binary signals d1, d2, d3 having a nominal bit rate of 44 736 kbit/s into the binary signals d10, d20, d30 having a nominal bit rate of 46 421.3 kbit/s (accurately $\frac{1}{3}$ part of the nominal higher-order bit rate of 139 264 kbit/s). The time-sequential diagram b of FIG. 6 illustrates an example of a reduced frame derived from the frame of diagram a by representing only the bits in the bit positions 1+3p, where p = 0, 1, 2, ..., 316, 317, the duration of each bit time slot being increased by a factor of three and consequently corresponding to the bit rate of 46 421.3 kbit/s. So diagram b of FIG. 6 shows the structure of the signal applied to parallel-to-serial converter 9 in FIG. 1 by the OR-gate 8 receiving signal d10. In this reduced frame of diagram b, the bit positions 1, 2, 3, 4 in set I and the bit positions 2, 3 in set IV, respectively are reserved for the frame alignment bits F1, F4, F7, F10 (having the values 1, 1, 1, 0) and the service bits S11, S12, which bits are added in the multiplexer unit 7 by means of the relevant OR-gate 8, while all the other bit positions are assigned to the bits of signal d10. Of the last-mentioned bit positions, the first bit position in the sets II–VI are reserved for a justification service bit ans the second bit position in set VI for a justification bit, while the remaining bit positions are occupied by the information bits of signal d1.

The manner in which tributary signal d1 is converted into signal d10 having a reduced frame in accordance with diagram b of FIG. 6 will be explained with reference to FIG. 7, which shows an example of one of the three identical block converters 6 of FIG. 1. The 44 736 kHz read clock from jitter reducing unit 5 in FIG. 4 is employed in FIG. 7 for writing the binary signal d1 into an elastic memory 61. This elastic memory 61 is read out under the control of a 46 421.3 kHz read clock, predetermined clock pulses of which are suppressed so that memory 61 is then not read out. Suppressing clock pulses is effected in predetermined bit time slots of the reduced frame in diagram b of FIG. 6, more specifically in bit positions 1, 2, 3, 4 of set I, bit positions 2, 3 of set IV and bit position 1 of sets II–VI. In time-sequential diagram c of FIG. 6 this clock pulse suppression is symbolically represented by a low level, while a high level consequently indicates that memory 61 is read out. This read clock with "holes" is generated in multiplexer unit 7 of FIG. 1 by means of a clock distributor 18, which derives this read clock, and furthermore all the required clock signals, in known manner from the 139 264 kHz system clock of oscillator 10 by means of division and logic selection. More particularly, clock distributor 18 also generates a clock for the control of a circuit 19 which via OR-gate 8 inserts the frame alignment bits F1, F4, F7, F10 and the service bits S11, S12 into the bit stream of signal 10 in the bit positions 1, 2, 3, 4 of set I and bit positions 2, 3 of set IV in the reduced frame of diagram b in FIG. 6 which bit positions are reserved for that purpose.

Figure 7:
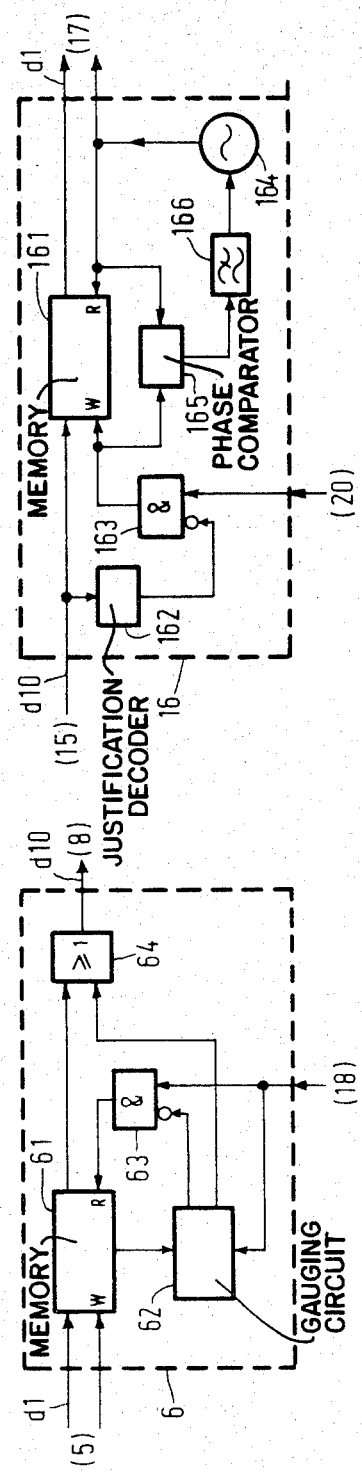
FIG. 7 shows a block diagram of a block converter for the transmitter of the system shown in FIG. 1.

So in FIG. 7 the rate at which elastic memory 61 is read out is faster than the rate at which writing is effected. In order to prevent memory 61 from being emptied as a result thereof, the degree of filling of memory 61 is monitored by a gauging circuit 62. When a predetermined filling-degree of memory 61 is fallen short off, this gauging circuit 62 generates a control signal for an inhibit gate 63 in order to suppress in the read clock with "holes", received from clock distributor 18 in FIG. 1, the subsequent clock pulse in the bit position 2 of set VI of the reduced frame, so that memory 61 is then not read out and a justification bit $J_1$ without information-content is added in the correct bit position (indicated by a cross in diagram c of FIG. 6) to the read signal. To indicate the information-less status of this justification bit $J_1$, gauging circuit 62 then also generates five logic 1 bits which are added to the signal read out from memory 61 by means of an OR-gate 64, namely in the first bit position of the sets II–VI of the reduced frame which is reserved for the justification service bits C11–C15. As long as gauging circuit 62 does not detect that a predetermined filling-degree of memory 61 is fallen short off, memory 61 is read out in bit time slot 2 of set VI of the reduced frame and the status of this bit time slot then containing an information bit of signal d1 is indicated in that event by five logic 0 bits in the positions of the justification service bits C11–C15.

The conversion of the other tributary signals d2, d3 into the signals d20, d30 is effected in a similar manner by employing reduced frames of the same structure as those of diagram b in FIG. 6, circuit 19 now inserting the frame alignment bits F2, F5, F8, F11 and F3, F6, F9, F12 and the service bits S21, S22 and S31, S32 into the bit streams of the signals d20, d30 in the bit positions 1, 2, 3, 4 of set I and bit positions 2, 3 of set IV of the reduced frame which bit positions are reserved for that purpose.

In order to recover these signals d10, d20, d30 from the three outputs of serial-to-parallel converter 15 in receiver 2, converter 15 is controlled by a clock of 46

421.3 kHz, the clock pulses of which are suppressed in the bit time slots for the frame alignment bits and the service bits of the reduced frame. In the time-sequential diagram d of FIG. 6 this conversion clock with "holes" is represented in the same way as the read clock with "holes" in diagram c. Both clocks are generated in the demultiplexer unit 13 of FIG. 1 by a clock distributor 20, which by means of synchronization detector 14, is synchronized with the frame of the received composite signal and derives both clocks in known manner from the recovered system clock of 139 264 kHz by means of division and logic selection.

Figure 8:
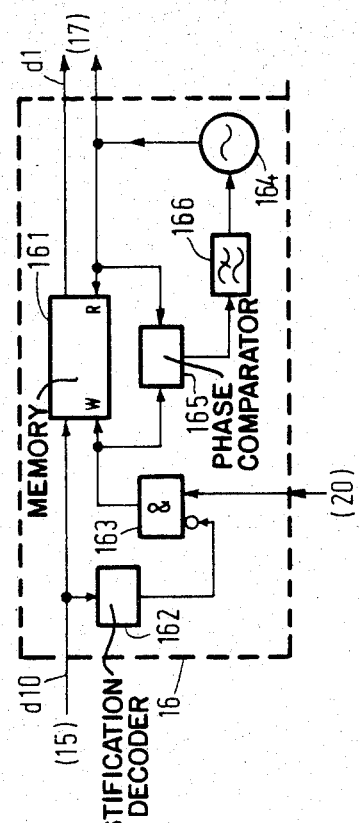
FIG. 8 shows a block diagram of a block converter for the receiver of the system shown in FIG. 1.

The manner in which signal d10 is converted into the tributary signal d1 by means of the read clock with "holes" shown in diagram c in FIG. 6, will be explained with reference to FIG. 8 which shows an example of one of the three identical block converters 16 of FIG. 1. The read clock with "holes" generated by clock distributor 20 of FIG. 1 is employed in FIG. 8 for writing binary signal d10 into an elastic memory 161, the justification service bits C11–C15 however not being written in as in the bit time slots reserved for that purpose the clock pulses of the read clock ar missing (see diagram c in FIG. 6). The status of the justification bit $J_1$ is detected by means of a justification decoder 162, in which a majority decision about the logic value of the justification service bits C11–C15 is taken and, at the occurrence of at least three logic 1 bits (the characteristic feature for an informationless justification bit $J_1$) a control signal for an inhibit gate 163 is generated to provide an additional "hole" in the read clock with "holes", namely by suppressing the subsequent clock pulse in the bit position 2 of set VI of the reduced frame, as in that event the justification bit $J_1$ is no information bit of signal d1 and consequently ought not be written into memory 161. So writing into elastic memory 61 is not effected at equidistant instants, but reading out must indeed be effected at equidistant instants. The read clock for memory 161 is produced by a voltage-controlled oscillator 164 having a rest frequency of 44 736 kHz, which is included in a phase-locked loop. This loop comprises a phase comparator 165 to which the 46 421.3 kHz clock with "holes" and the read clock of 44 736 kHz are applied and whose output signal is filtered in a low-pass filter 166 and is thereafter applied to the control input of oscillator 164. Thus, there are available at the output of block converter 16 of FIG. 8 the signal d1 having the original nominal bit rate of 44 736 kbit/s read out from memory 161 and the associated clock signal having the original nominal frequency of 44 736 kHz. By employing an elastic memory 161 having a sufficiently large capacity and a low-pass filter 166 having a sufficiently low cut-off frequency, the jitter of the recovered tributary signal d1 can be kept below acceptable limits in a simple manner. In this respect it should be noted that the choice of the bit positions for the service bits in set IV of the reduced frame has an advantageous influence on the spectral distribution of this jitter.

In the embodiment described, the frame of the composite signal comprises 954 bits arranged in six sets I–VI of 159 bits each. A total of six service bits per frame are present in the bit positions 4–9 of set IV, where bit position 4 of set IV may be used for the transmission of an alarm return message to the equipment in the receiver when specific error conditions are detected in the equipment in the transmitter. As each service bit represents a separate channel having a transmission capacity of 146 kbit/s there is then available a transmission capacity of 730 kbit/s for all sorts of auxiliary facilities.

When a lower total transmission capacity for the service functions is sufficient, an alternative choice may be to choose only three service bits in the frame of the composite signal. In that case, however, a new determination mus be effected of the number of information bits N supplied by a tributary signal in each frame interval. On the analogy of relation (1) then there holds for N and $\phi$ the relation:

$$\frac{N + 1 - Q}{3N + 33} = \frac{44\ 736}{139\ 264} \qquad (2)$$

With an initial choice $\phi = 0.57$ a value $N = 280.14$ then follows from (2). As the further structure of the frame is not changed and consequently the $3N+33$ bits are arranged in six sets each having the same number of bits equal to an integral multiple of three, the ultimate value of N is then fixed at $N=277$, so that the frame then comprises 864 bits arranged in six sets of 144 bits each. From (2) it then follows that the ultimate value of $\phi$ is equal to $\phi = 0.456$. A total transmission capacity of 483 kbit/s is then available for the service functions.

What is claimed is:

1. A fourth-order digital multiplex system comprising a transmitter having a digital multiplexer and a receiver having a digital demultiplexer for TDM transmission of a plurality of digital signals at a nominal third-order bit rate of 44,736 kbit/s over a common digital path between the said multiplexer and the said demultiplexer, characterized in that the said multiplexer is adapted for cyclically bit-wise interleaving three digital signals having nominal third-order bit rates of 44,736 kbit/s into a composite digital signal having a nominal fourth-order bit rate of 139,264 kbit/s and a frame comprising a 12 bit frame alignment signal, a number of service bits and, in addition, for each of the said three signals, a number N of information bits as well as one justification bit with five associated justification service bits, the said number N being such that the nominal justification ratio of the composite digital signal is in the range from 0.40 to 0.60 but exclusive of the range from 0.46 to 0.54, which frame is arranged in six consecutive sets having equal numbers of bit time slots, wherein the bits of the frame alignment signal occupy the first 12 bit positions of the first set, the justification service bits of the first, second and third of the said three signals occupy the first, second and third bit positions, respectively of, in succession, the second set to the sixth set, the service bits occupy the bit positions following after the third bit position in the fourth set, and the information bits of the said three signals cyclically occupy the remaining bit positions of the six sets;

and the said demultiplexer is adapted for separating the said composite signal into the said three signals.

2. A fourth-order digital multiplex system as claimed in claim 1, characterized in that the frame of the said composite digital signal comprises six service bits which occupy the fourth to ninth bit positions, respectively, in the fourth of said six consecutive sets.

3. A fourth-order digital multiplex system as claimed in claim 2, characterized in that said number N of information bits is 306 and the frame of the said composite signal comprises 954 bit time slots, arranged in six consecutive sets of 159 bit time slots.

* * * * *